United States Patent [19]

Deason et al.

[11] Patent Number: 5,048,969
[45] Date of Patent: Sep. 17, 1991

[54] PIEZOELECTRIC MEASUREMENT OF LASER POWER

[75] Inventors: Vance A. Deason; John A. Johnson; Kenneth L. Telschow, all of Idaho Falls, Id.

[73] Assignee: The United States of America as represented by the United States Department of Energy, Washington, D.C.

[21] Appl. No.: 438,378

[22] Filed: Nov. 20, 1989

[51] Int. Cl.$^5$ .................... G01N 21/00; G01J 5/44; G01J 1/00; G01L 1/16
[52] U.S. Cl. ............................ 356/432; 356/13; 356/213; 73/800
[58] Field of Search ............... 356/432, 43, 216, 223, 356/234, 375; 73/800, 801, 861.18, DIG. 1, DIG. 4; 310/311, 339

[56] References Cited

U.S. PATENT DOCUMENTS 4,474,468 10/1984 Shirakura et al. ............... 356/375
4,761,582 8/1988 McKee ............................. 310/339

Primary Examiner—Vincent P. McGraw
Assistant Examiner—LaCharles P. Keesee
Attorney, Agent, or Firm—Bradley W. Smith; John M. Albrecht; William R. Moser

[57] ABSTRACT

A method for measuring the energy of individual laser pulses or a series of laser pulses by reading the output of a piezoelectric (PZ) transducer which has received a known fraction of the total laser pulse beam. An apparatus is disclosed that reduces the incident energy on the PZ transducer by means of a beam splitter placed in the beam of the laser pulses.

19 Claims, 4 Drawing Sheets

PIEZOELECTRIC MEASUREMENT OF LASER POWER

CONTRACTUAL ORIGIN OF THE INVENTION

The United States Government has rights in this invention pursuant to Contract No. DE-AC07-76ID01570 between the United States Department of Energy and EG&G Idaho, Inc.

BACKGROUND OF THE INVENTION

This invention relates to the use of a piezoelectric (PZ) transducer as a method of measuring the energy of a pulsed laser and an apparatus that can measure this energy.

Conventional power and energy meters, for high power pulsed lasers include various thermal and electro-optic devices designed to convert all or part of the pulse energy into thermal or electrical energy. A typical high power laser power meter will consist of a thermopile (a device utilizing thermocouples for converting thermal energy into electrical energy) and a device for monitoring the electrical output of the thermopile where it is absorbed and causes a temperature increase in the material of the thermopile. As the temperature rises, the array of thermocouples generate an electric potential which is sensed by some sort of voltage metering device.

The length of time for such systems to come to equilibrium after the introduction of the laser beam is typically quite long (perhaps minutes). By introducing a series of pulses from a pulsed laser, the energy of the pulses may be integrated to produce a total energy for the entire sequence of pulses. The individual pulse is inferred by dividing the total energy measured by the number of pulses. However, such measurement assumes equal pulse energy, which may or may not be valid. Finally, such measurement devices typically encounter relatively severe problems with "drift" in the laser output caused by environmental temperature variations, instabilities in the laser control electronics or other effects, all of which are exacerbated by the relatively slow response time of the devices.

More sophisticated devices such as photodiodes, which measure laser power directly by impinging the laser beam on the measuring device, are prone to damage, especially when impacted with a beam from a high power laser.

A particularly vexing problem arises in the measurement of the energy of a rapidly pulsed laser, especially when large energies or power levels are involved. In such cases, one of two measurement approaches has conventionally been taken. Firstly, by monitoring the relative brightness of the successive pulses, while measuring the total energy in the pulse train with a thermal power meter, one can distribute the total measured energy among the various pulses based on the relative brightness of the pulses. Secondly, one can measure the brightness of the individual pulses using a conventional optical meter. The brightness is related to the pulse energy and is a measure of such energy. In using this method, all or part of the photons contained in the laser pulse fall on a detector material such as silicon or germanium, and their energy is converted into an electrical signal proportional to the number and energy of the photons. It should be noted that different detector materials must be used for different portions of the optical spectrum. Detector materials for visible radiation include silicon and germanium photodiodes, while for the infrared spectrum, materials such as HgCdTe, InSb, InGaAs, PbS and InAs, among others, have been used as photon detectors. Another class of photon detector are photomultiplier tubes (PMT), however, these have extreme sensitivity which generally precludes their use in high power measurements.

Problems exist with each of these approaches, especially with higher pulse energies. In particular, the direct measurement of the brightness of laser pulses becomes very difficult due to the limited dynamic range of typical photon sensors. Additionally, small portions of the pulse must be separated (the beam must be "split") for measurement in a way that allows one to relate this partial energy back to the true total energy of the original pulse. Actual damage to the optical detector is a distinct possibility when energies exceed damage thresholds, as may happen when unknown pulses or pulses having large energy variations must be measured.

U.S. Pat. No. 4,820,047, issued Apr. 11, 1989, discloses a laser heterodyne apparatus for measuring optical power. A detection system is provided which has a very wide linear dynamic range (for a typical laser, fifteen orders of magnitude), as well as a high sensitivity (shot. noise limited), high angular resolution (diffraction limited), and which is also polarization resolving. The apparatus is used for measuring optical power, and includes a system of producing two optical beams such that at some point and thereafter along an optical path of the beams, a frequency difference exists between the two beams. One of the two beams has a known or constant optical power, and the other of the two beams is the beam whose power is to be measured. A combining element for coherently combining the two optical beams is included. An optical detection system receives the combined optical beam, and in response provides an electrical signal modulated at the difference between the frequencies of the optical fields of the two optical beams. Additionally, U.S. Pat. No. 4,474,468, issued Oct. 2, 1984, discloses a method and apparatus for measuring the power of a laser beam. A thin wire is arranged across the laser beam, and the change in resistance of the wire is measured by a resistance meter while moving the wire by a driving mechanism, thereby measuring the power of the laser beam or the position of the wire in the laser beam. The apparatus can be used for monitoring the power of the laser beam or the position of the beam.

SUMMARY OF THE INVENTION

This invention is useful in the measurement of the energy contained in a laser pulse or series of laser pulses. The opto-acoustic pulse energy meter disclosed herein solves the problems experienced by prior art devices. In particular, this opto-acoustic device is usable over a wide range of laser energies, and can directly measure relatively large pulse energies, even if multiple pulses occur in rapid succession. Additionally, the detector itself is relatively inexpensive, consisting of a piezoelectric transducer (PZ) with a metal or ceramic coating or buffer plate which, with associated electronic recording devices, generates and records an acoustic signal when struck by a laser pulse. The surface coating can be optimized to improve the conversion of optical to acoustic energy.

The invention disclosed consists of a method of measuring the energy in a pulsed laser beam by reflecting part of the beam to a piezoelectric transducer having an absorbent coating. The absorbed laser pulse causes thermal expansion in the coating which generates an elastic ultrasonic pulse in the PZ transducer. The transducer output is a voltage pulse, which is measured by a peak reading voltmeter and is proportional to the pulsed laser beam energy. More specifically, the present invention comprises a method of measuring the energy of a pulsed laser beam by directing all or part of the beam onto a coated PZ transducer wherein thermal expansion of the absorbent coating generates a voltage pulse in the PZ transducer which is then monitored by a means to measure a peak value of the voltage pulse. The apparatus of the present invention comprises a first beam splitter, a PZ transducer placed in the path of a reflected portion of the laser beam, an absorbent coating on the PZ transducer, and means connecting the PZ transducer to a peak voltage measuring means.

DETAILED DESCRIPTION OF THE INVENTION

Figure 1:
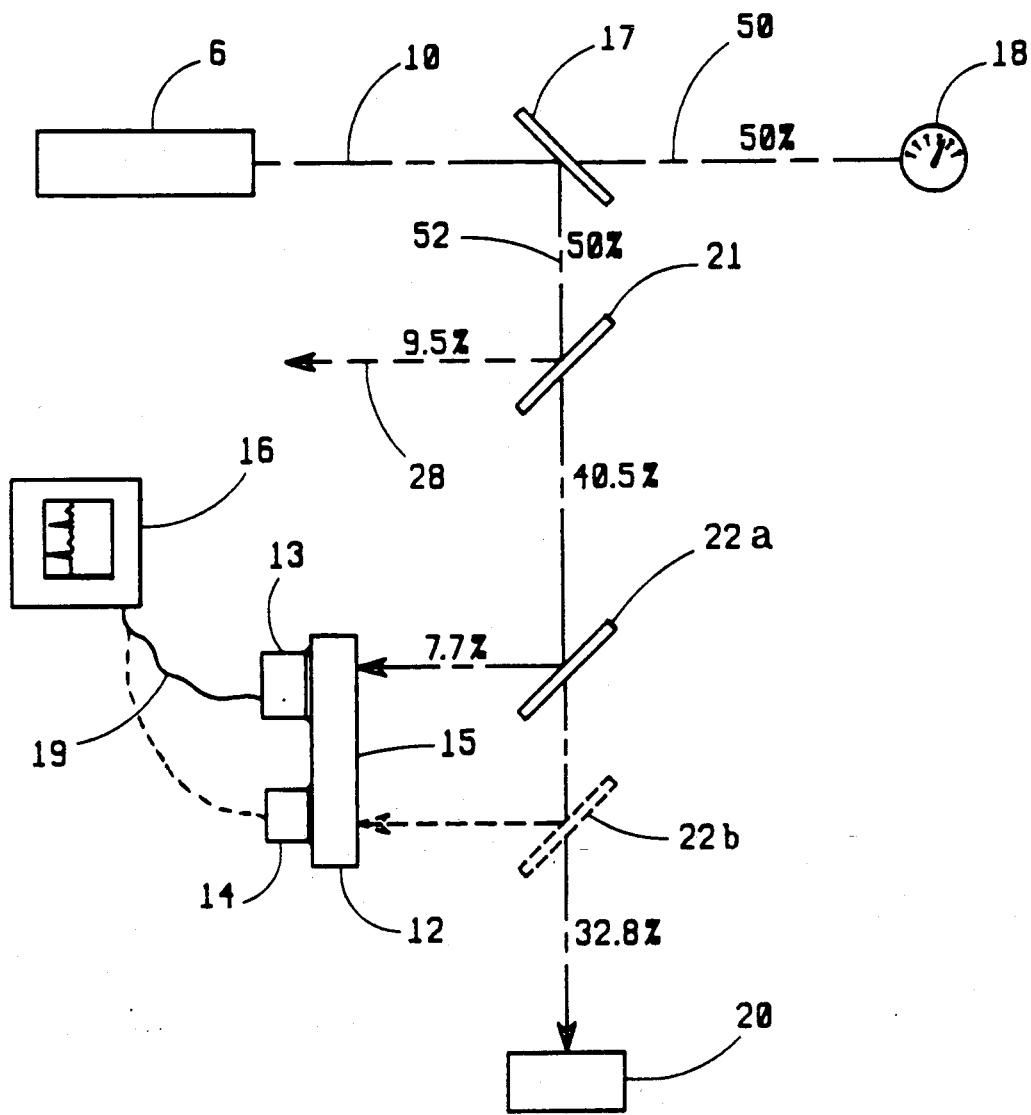
FIG. 1 schematically illustrates an apparatus to record the ultrasonic signal amplitude from absorption of a laser pulse by a steel block.

Referring to FIG. 1, to demonstrate the feasibility of the use of the PZ transducer to directly measure laser energy, a pulsed ruby laser 6 was used to generate a pulsed laser beam 10, which upon impact produced elastic waves in a one-inch thick steel block 12. While it should be appreciated that any conventional pulsed laser is useful in the process of this invention, the ruby laser utilized herein was manufactured by Apollo Lasers, Inc., and the pulse generated by what is known in the art as "Q-switching", the production of very short intense pulses by enhancing the storage and dumping of electronic energy in and out of the laser medium. Each pulse has energies ranging from about 0.000079 to about 0.1 joules, and has a pulse width of from about 20 to about 50 nanoseconds. The elastic wave amplitudes were subsequently measured by two contact PZ transducers 13 and 14 positioned on the side of the block opposite the laser source. The PZ transducers utilized herein are manufactured by Panametrics Co. but are representative of those commonly available. The PZ transducers are made from quartz and both are one-half inch in diameter and have a center frequency of 2.25 MHz. The first transducer 13 is manufactured to respond to longitudinal waves in the block while the second transducer 14 responds to shear waves. PZ transducers can be manufactured to respond selectively to either shear waves or longitudinal waves depending upon the manner in which the piezoelectric crystal structure has been cut in the fabrication process. Both types of transducers were used in order to determine if they were both responsive and accurate in the measurement of pulsed energy from a pulsed laser. The ultrasonic wave produced by conventional pulsed lasers has longitudinal and shear components, whose amplitudes are both proportional to the laser pulse energy. While the apparatus has been specifically described, it is to be understood that such apparatus is exemplary only and the invention is not to be limited to the particular apparatus employed. Accordingly, the method of the invention is applicable to numerous different apparatus not disclosed herein.

The laser pulse 10 was directed alternately on a center line of each transducer on the side 15 of the steel block 12 opposite the PZ transducers 13, 14. Each laser pulse impacting on surface 15 generates a combined longitudinal/shear displacement wave which travels through the steel block 12 to the transducers 13, 14 and is subsequently transferred through wire 19 and recorded by a peak voltage measuring means, in the form of a transient waveform recorder 16. A 50% beam splitter 17 passes half of the laser pulse 50 to a conventional thermopile-type laser pulse energy meter 18. A thermopile-type meter has an output voltage proportional to the incident radiant power. This unit determines the pulse energy by recording the heat generated upon absorption of a continuous train of laser pulses. The other half 52 of the laser pulse 10 is reflected either to the sample surface 20 or to at least one of the reflecting glass plates (mirror-type beam splitters) 21 and 22 (approximately 19% reflection per plate). Although mirror-type beam splitters are disclosed herein, other types of beam splitters well-known to those skilled in the art, may be used.

Referring to FIG. 1, the use of first and second 19% reflecting glass plates 21 and 22 reduces the energy of the laser pulse incident on the steel block 12 to 7.7%. The remaining energy (92.3%) is directed to the thermopile meter 18, the sample surface 20, and 9.5% is unused as illustrated at 28. The second glass plate 22 can be relocated from a first position as illustrated at 22a. to the second position illustrated in broken lines at 22b. in order to alternate between the longitudinal wave PZ transducer 13 to the shear wave PZ transducer 14. Therefore, it is possible to determine the characteristics of both longitudinal and shear wave pulses with a single apparatus. Alternatively, two separate and distinct reflecting plates 22a. and 22b. may be provided in order to avoid moving a single plate. In such case, reflecting plate 22a. can be pivoted to pass the beam to reflecting plate 22b.

Figure 2:
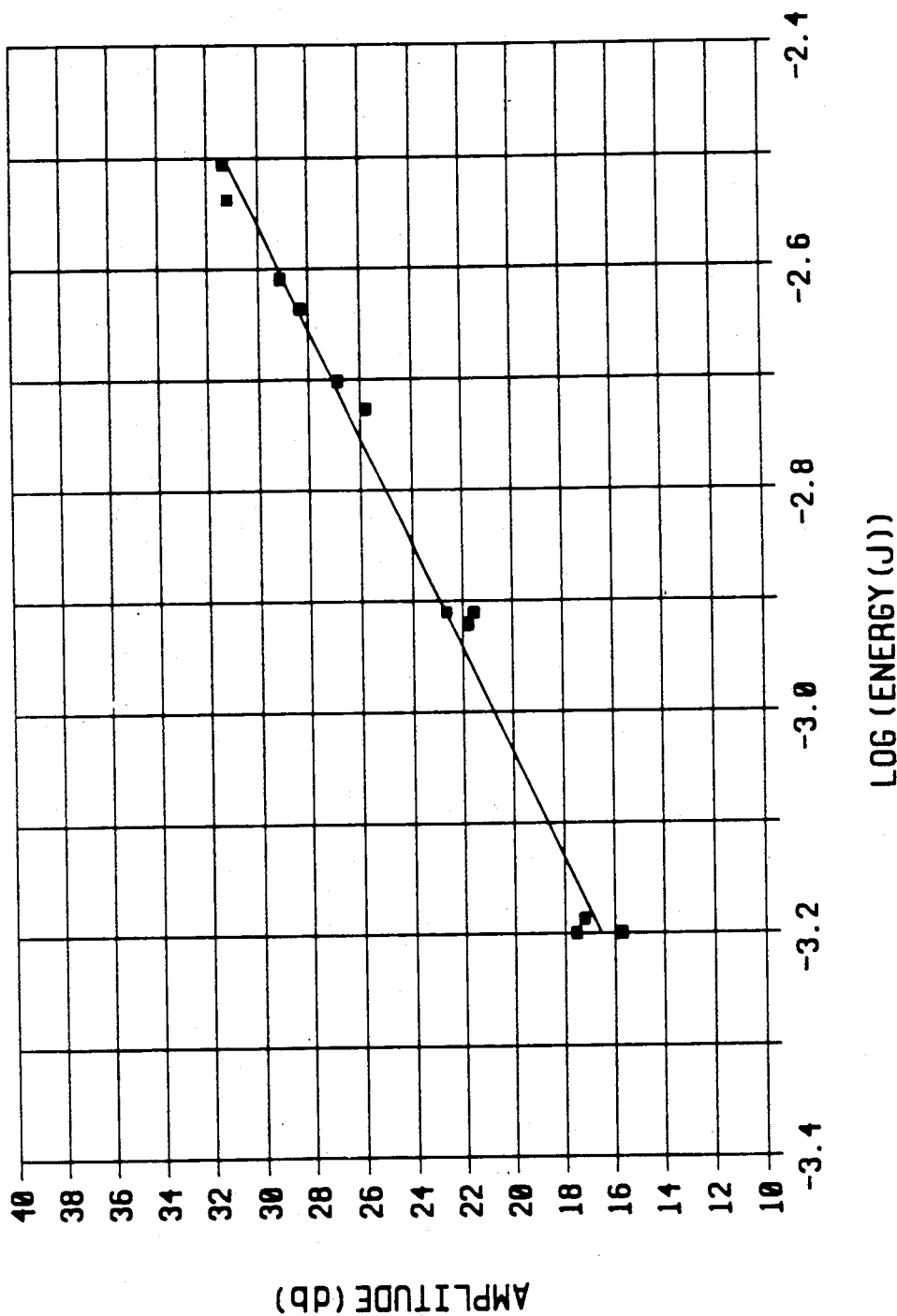
FIG. 2 graphically illustrates the relationship of longitudinal waveform amplitude versus pulse energy.
Figure 3:
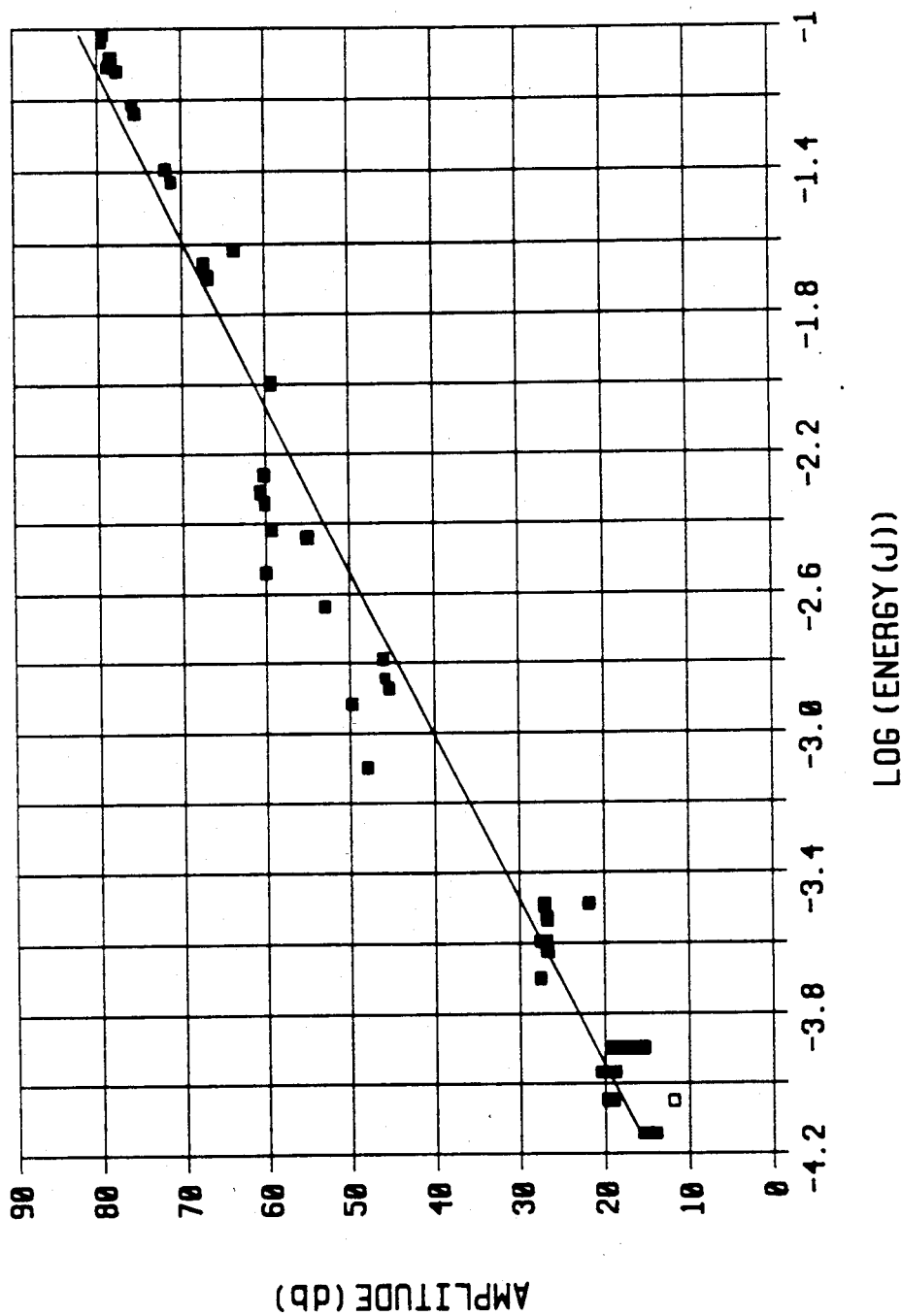
FIG. 3 graphically illustrates the relationship of shear wave amplitudes versus pulse energy.

FIGS. 2 and 3 illustrate the measured longitudinal and shear wave amplitudes, respectively, as a function of the incident laser pulse energy in a logarithmic graphical form. The amplitudes are indicated in decibels (db) where db = 20 log V/V. In FIGS. 2 and 3, V is a reference value arbitrarily chosen, which would be fixed by calibration in an actual energy meter configuration. The straight lines 24 (FIG. 2) and 26 (FIG. 3) have a slope of about 20.0 (slope = the range of db values divided by the range of log energy values) indicating a proportionality between the signal amplitude and the laser pulse energy in each of FIGS. 2 and 3. Since each laser pulse generates a single elastic wave, which can be individually resolved, the PZ transducers are capable of measuring the energy content of a single laser pulse in real-time.

Figure 4:
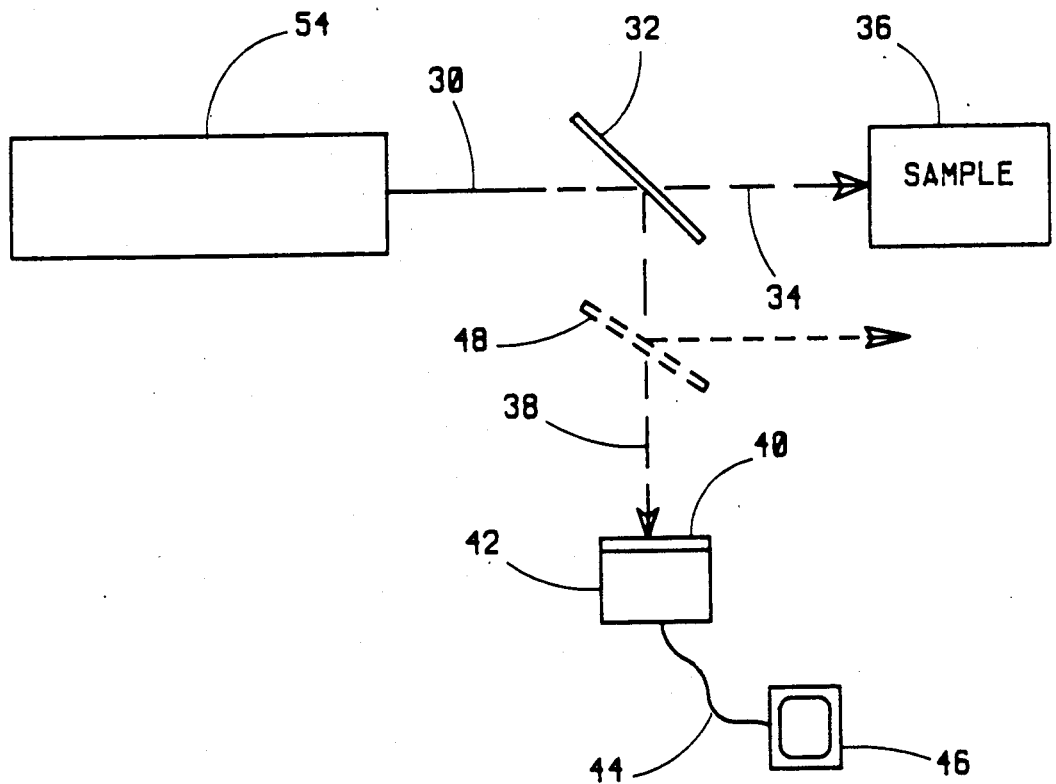
FIG. 4 schematically illustrates the use of a PZ transducer to measure pulsed laser energy.

A practical pulse energy measuring system is illustrated in FIG. 4 wherein a laser pulse 30 from a conventional pulsed laser 54 is directed to a known mirror-type beam splitter 32. Ninety percent or more of the laser pulse energy 34 can be passed on to sample 36. When incorporated into a manufacturing, diagnostic or research process, the system of FIG. 4 can be configured as a monitoring system to provide continuous information about laser energy. The sample 36 may be the intended recipient of the laser energy in the manufacturing process. The 10% remaining pulse energy 38 is reflected by splitter 32 to absorbent coating 40 on PZ transducer 42. As will be readily apparent to those skilled in the art, many other known ratios are available in mirror-type beam splitters, i.e. they are commercially available down to 0.5% reflectivity and greater than 90% transmission.

The absorption coating material 40 on the surface of the PZ transducer 42 absorbs the laser pulse energy and by a known fraction of the incident flux protects the PZ transducer 42. Coatings found acceptable for this purpose include blackened metal and ceramic materials. A thin coating is most useful. The optical requirements of the coating 40 are identical to those of conventional power meters which operate on the principle of absorbed laser light with subsequent conversion into thermal energy (i.e. the thermopile power meter). A preferred material for the absorbent coating 40 is one that can withstand the pulse energies and absorb laser pulses over a broad frequency range, thereby accommodating different types of laser pulses.

The principle of operation of this method is based on the absorption of the laser pulse in the absorbent coating, subsequent local heating of the coating 40 and transient thermal expansion which produces a transient local stress/strain. This strain is transferred to the PZ transducer 42 by either direct contact bonding or elastic wave propagation through the thickness of the coating. The transient elastic stress/strain pulse excites the PZ in its fundamental mode of oscillation.

The amplitude of the PZ transducer oscillation (and therefore the output voltage) is proportional only to the laser pulse energy, so long as the laser pulse width (in time) is significantly less than the period of oscillation of the fundamental resonance of the PZ transducer. This is achieved by using a relatively low frequency PZ transducer, on the order of 1–10 MHz for 10 nanosecond laser pulses. In order for the PZ transducer to respond to each laser pulse separately, it must be damped and its fundamental oscillation frequency must be significantly larger than the laser pulse repetition frequency.

The transducer 42 converts the measured strain into a voltage pulse by conventional technology. The pulse amplitude is conducted via wire 44 and measured by a suitable peak reading voltmeter or integrating electronic circuit 46 which has been previously calibrated. The result, based on the prior calibration, is an output reading proportional to the total laser pulse energy. The integrating electronic circuit 46 is therefore capable of directly recording laser pulse energies in real-time, per individual pulse, with high sensitivity.

Large laser pulse energies can be measured by the use of a second mirror-type beam splitter 48 placed in laser beam 38. Large laser pulse energies can also be determined by alteration of the laser pulse absorbing coating material. Using a coating material with a high, but known, reflection coefficient extends the dynamic range of the instrument by factors of 10–1000.

The apparatus disclosed herein is relatively inexpensive and compact, being essentially the same size as the PZ transducer. The frequency of the transducer must be chosen such that the laser pulse width (in seconds) is smaller than the period of oscillation of the fundamental resonance of the PZ transducer, so that the transducer with a waveform amplitude is only a function of the laser pulse energy and not its time profile. A PZ transducer fundamental resonant frequency of 1–10 MHz would be adequate for laser pulse widths of 10 nanoseconds and pulse repetition rates up to 10 KHz. The preferred type of PZ transducer is the longitudinal type because of its lower cost.

The method and apparatus of this invention may be installed as an on-going feature of a pulsed laser system or may be used merely to measure the power of a pulsed laser on a one-time basis. For example, the method may be utilized in a medical procedure using lasers where precise laser power is required. A small portion of the beam may be split off and while the procedure is progressing, continuous measurement of laser power may be undertaken. At any point when the measured laser power is outside preset limits, the recorder 16 may be provided with alarm features signaling the out-of-limit laser power. Corrective action can then be taken. Similarly, the system can be installed in an on-going manufacturing line utilizing lasers to indicate a non-standard laser power.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A method of measuring the energy of a pulsed laser beam directed at a sample comprising:
   a. reflecting a portion of the pulsed laser beam;
   b. absorbing the energy of the reflected portion of the pulsed laser beam in an absorbent coating, such that localized heating occurs in the absorbent coating causing thermal expansion thereof;
   c. acoustically bonding a piezoelectric transducer to the absorbent coating wherein the thermal expansion of the absorbent coating generates a voltage pulse in the piezoelectric transducer; and
   d. conducting the voltage pulse to means to measure a peak voltage of the voltage pulse.

2. The method as recited in claim 1, wherein the transducer is responsive to longitudinal vibration waves.

3. The method as recited in claim 1, wherein the transducer is responsive to shear vibration waves.

4. The method as recited in claim 1, wherein the piezoelectric transducer has a fundamental resonant frequency in the range of from about 1 to about 10 MHz.

5. The method as recited in claim 1, wherein the period of oscillation of the fundamental resonance of the piezoelectric transducer is greater than the laser pulse width.

6. The method as recited in claim 1, wherein the absorbent coating is selected from the group of materials consisting of metals and ceramics.

7. The method as recited in claim 1, wherein the laser pulse energy measured falls within the range of 0.000079 to 0.1 joules.

8. The method as recited in claim 1, wherein the portion of the pulsed laser beam directed to the piezoelectric transducer is reflected by a first beam splitter.

9. The method as recited in claim 8, wherein excess energy is diverted by a second beam splitter placed between the first beam splitter and the piezoelectric transducer.

10. The method as recited in claim 1, wherein the piezoelectric transducer is acoustically coupled to a steel block which comprises said absorbent coating.

11. An apparatus that measures the energy of a pulsed laser beam comprising:
   a) a first beam splitter in the path of the pulsed laser beam to pass a portion of the pulsed laser beam and reflect a portion of the pulsed laser beam;
   b) a piezoelectric transducer placed in the path of the reflected portion of the pulsed laser beam;
   c) an absorbent coating bonded to the surface of the piezoelectric transducer; and
   d) means connecting the piezoelectric transducer to a peak voltage measuring means.

12. The method as recited in claim 11, wherein the beam splitter is a 90% transmitting and 10% reflecting mirror-type beam splitter.

13. The method as recited in claim 11, wherein the absorbent coating is selected from the group of materials consisting of metals and ceramics.

14. The method as recited in claim 11, wherein the piezoelectric transducer has a fundamental resonant frequency in the range of from 1 to 10 megahertz.

15. The method as recited in claim 11, wherein an additional know ratio beam splitter is placed in the reflected portion of the beam between the first beam spitter and the piezoelectric transducer.

16. The method as recited in claim 11, wherein the piezoelectric transducer is acoustically coupled to a steel block which comprises said absorbent coating.

17. An apparatus as recited in claim 11, wherein the transducer is responsive to longitudinal vibration waves.

18. An apparatus as recited in claim 11, wherein the transducer is responsive to shear vibration waves.

19. An apparatus as recited in claim 11, wherein the period of oscillation of the fundamental resonance of the piezoelectric transducer is greater than the laser pulse width.

* * * * *